Figure 1:
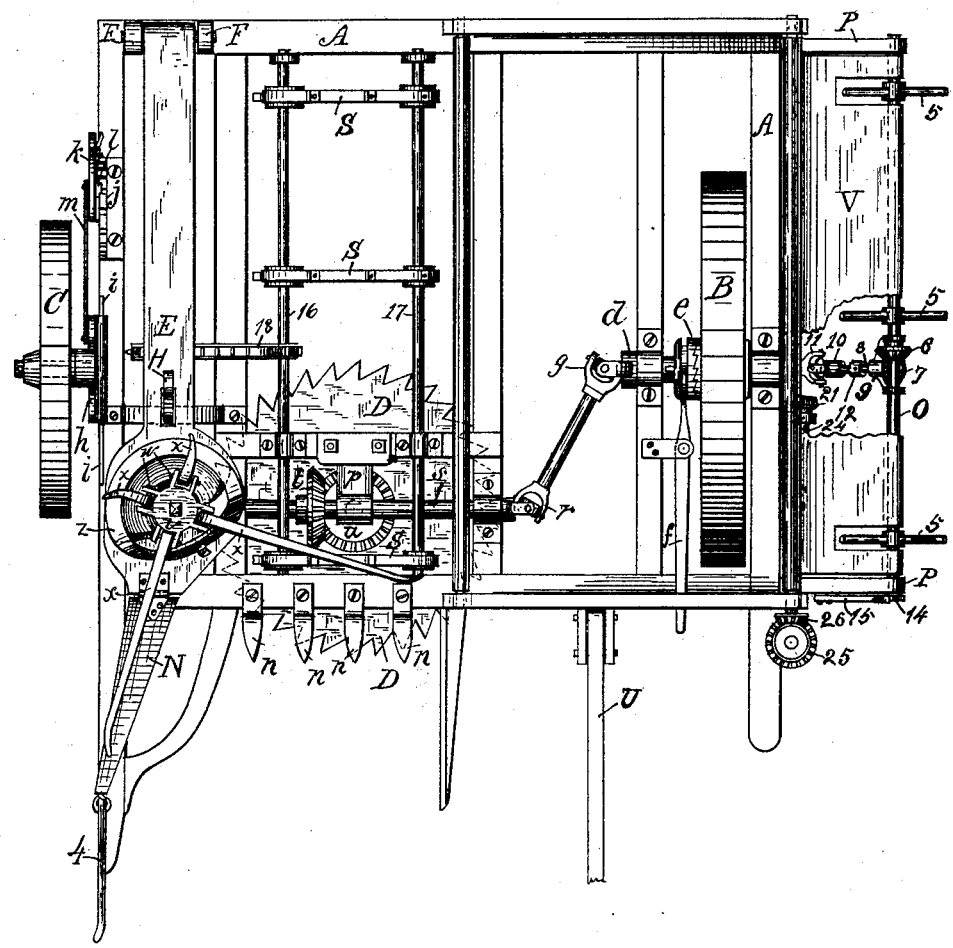

(No Model.)  3 Sheets—Sheet 1.

G. G. F. BOSWELL.
STALK HARVESTER.

No. 360,652. Patented Apr. 5, 1887.

WITNESSES:
H. P. Hood.
V. M. Hood

INVENTOR:
Geo. G. F. Boswell.

(No Model.) 3 Sheets—Sheet 2.
G. G. F. BOSWELL.
STALK HARVESTER.
No. 360,652. Patented Apr. 5, 1887.
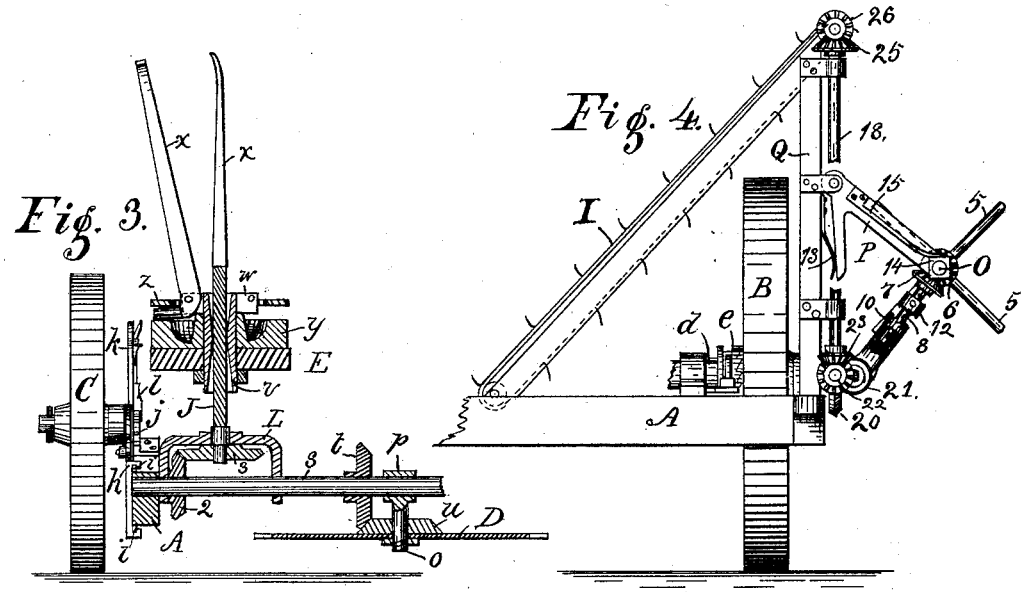
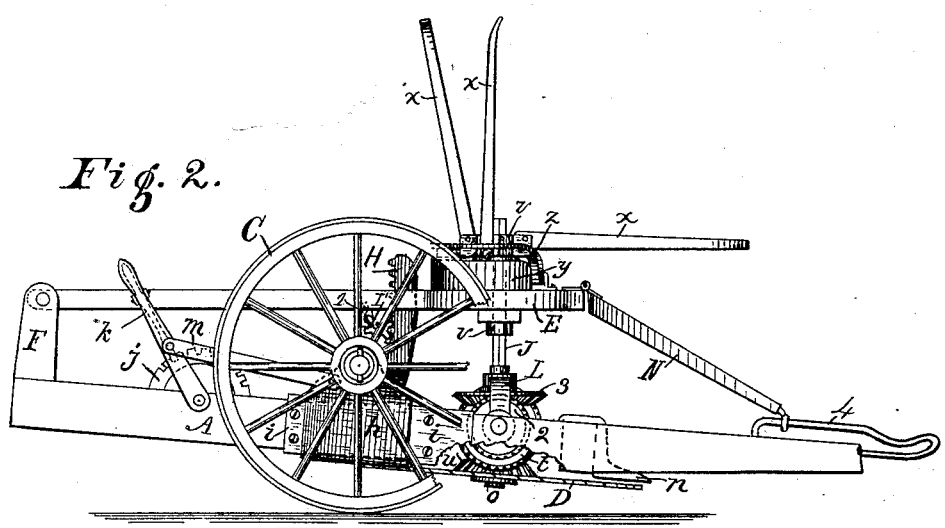
WITNESSES:
H. P. Hood,
V. M. Hood.
INVENTOR:
Geo. G. F. Boswell (No Model.)  
G. G. F. BOSWELL.  
STALK HARVESTER.

3 Sheets—Sheet 3.

No. 360,652. Patented Apr. 5, 1887.

Fig. 5.

Witnesses  
Chas. H. Leonard.  
V. M. Hood.

Inventor  
Geo. G. F. Boswell.  
By His Attorney  
H. P. Hood.

UNITED STATES PATENT OFFICE.

GEORGE G. F. BOSWELL, OF INDIANAPOLIS, INDIANA, ASSIGNOR OF TWO-FIFTHS TO JOSEPH E. BOSWELL, OF SAME PLACE.

STALK-HARVESTER.

SPECIFICATION forming part of Letters Patent No. 360,652, dated April 5, 1887.

Application filed March 8, 1886. Serial No. 194,442. (No model.)

*To all whom it may concern:*

Be it known that I, GEORGE G. F. BOSWELL, a citizen of the United States, residing at Indianapolis, in the county of Marion and State of Indiana, have invented a new and useful Improvement in Stalk-Harvesters, of which the following is a specification.

My invention relates to improvements in that class of stalk-harvesting machines which consists, essentially, of a frame mounted on a pair of carrying-wheels and supporting a cutting mechanism, a reel for presenting the stalks to the cutting mechanism, said reel being mounted on a vertically-adjustable arm, suitable elevator-belts for receiving and discharging the stalks when cut, and a dumping device for collecting and discharging the stalks in distinct masses, all of the operating parts being actuated by the principal carrying-wheel and suitable connecting mechanism.

The objects of my improvements are to provide an improved reel and means for operating the same in connection with the vertically-adjustable arm on which it is mounted, means for adjusting the relative position of one of the carrying-wheels, whereby more or less of the weight of the forward part of the machine is thrown upon the draft-pole, and an improved bunching and dumping mechanism, all as hereinafter fully described.

The accompanying drawings illustrate my invention.

Figure 1 is a plan in which the elevator-belt is omitted. Fig. 2 is a side elevation. Fig. 3 is a vertical section through the cutter and its driving mechanism. Fig. 4 is a partial front elevation. Fig. 5 is a side elevation similar to Fig. 2, but having the carrying-wheel and one side of the frame removed.

A is the main frame having the carrying-wheels B and C, and forming a movable support for the various parts. Wheel B is mounted on a shaft, $d$, so as to turn loosely thereon. Shaft $d$ is arranged to revolve in fixed bearings in the main frame, and is connected with wheel B, so as to turn therewith by means of a clutch, $e$, which is operated by a lever, $f$. Wheel C is mounted on a short axle, which is secured in a bracket, $h$. Said bracket is arranged to slide longitudinally on ways secured to the outside timber of the main frame, as at $i\ i$, the bracket being adjustably secured in position by means of the notched arch $j$, lever $k$, having a sliding pawl, $l$, which engages the arch, and a connecting-rod, $m$, having its opposite ends secured, respectively, to the lever and to the bracket, the purpose being to adjust the bearing of the forward part of the machine on the draft-pole, and consequently on the horses' necks when in operation.

The cutting mechanism consists of a circular saw, D, and the guard-fingers $n\ n\ n\ n$. Saw D is mounted so as to revolve on a short vertical shaft, $o$, Fig. 3, depending from a bracket, $p$, which is secured to a cross-timber of the main frame, motion being communicated thereto from wheel B by means of shaft $d$, universal joints $g$ and $r$, shaft $s$, and bevel-gears $t$ and $u$.

The teeth of saw D are sharpened so as to cut on the upper side only, and they are arranged in relation to the under side of the guard-fingers $n$, so as to make, in connection therewith, a shearing cut as the saw revolves.

E is a vertically-adjustable arm, on which the reel is supported. Said arm is hinged at one end to short posts F, projecting upward from the main frame. The reel is mounted on the opposite or free end of the arm, which is raised and lowered and adjustably secured in position by means of the pinion I, mounted on a short shaft arranged to turn in bearings secured to the under side of arm E and having the crank $c\ r$ secured thereto, and the rack-bar H, secured at its lower end to the main frame projecting through the arm and intermeshing with pinion I, the pinion being prevented from turning when adjusted by the pawl $l$.

The reel consists of a short hollow shaft, $v$, having a series of lateral lugs, $w$, to which are pivoted gathering-arms $x$, which are bent at their inner ends at nearly a right angle, said bent portions being arranged to pass between the upper surface of a cam, $y$, and a correspondingly-shaped guard-plate, $z$, which are secured to the table and sustain the hollow shaft $v$, so that as shaft $v$ is revolved, said arms, being guided and controlled by the cam and guard-plate, assume in succession a horizontal position as they approach the cutting mechanism and are raised to a vertical position as they recede therefrom.

J is a square vertical shaft having a journal turned on its lower end, which journal turns in a bearing in the yoke L, which embraces and rests upon the shaft s. The interior of hollow shaft v corresponds in shape with shaft J, and is adapted to slide easily along the shaft and to turn therewith. Shaft J is revolved by means of a pair of bevel-gears, 2 and 3, which are secured, respectively, to the shaft J and shaft s, the latter shaft being connected by intermediate mechanism with the wheel B, so as to turn therewith. The reel thus slides along shaft J and is rotated thereby at any required elevation to which table E may be adjusted.

N is a guard-bar hinged to the forward end of table E and arranged to slide along the guide-rod 4.

The dumping mechanism consists of a shaft, O, provided with a series of sets of radial arms, 5 5 5, and mounted so as to revolve in a pair of brackets, P P, which are hinged to standards Q, erected on opposite ends of the main frame. Secured to shaft O is a bevel gearwheel, 6, which intermeshes with a bevel gearwheel, 7, secured to a short shaft, 8, which is journaled in a swinging bearing, 9, depending from shaft O.

The lower end of shaft 8 is arranged to turn and to slide longitudinally within a short hollow shaft, 10, which is connected with shaft d, so as to turn therewith, by means of a universal joint-coupling, 11. The upper end of shaft 10 is notched to form, with a corresponding collar, 12, secured to shaft 8, a clutch, by means of which the motion of shaft 10 may be communicated to shafts 8 and O. Collar 12 is held normally clear of shaft 10 by means of suitable springs, like 13, placed under the inner ends of the brackets P P. On the outer end of shaft O is secured a rectangular collar, 14, the flat edges of which are engaged in succession as the shaft is revolved by a spring, 15, secured to the bracket P, the purpose being to hold the radial arms 5 in the position shown in Fig. 4, when the clutch 12 is disengaged.

S S S are conveyer-belts passing over suitable pulleys on shafts 16 and 17, which are driven by a chain belt, 18, passing over a sprocket-wheel, 27, Fig. 5, which is secured to a shaft, 28, having a bevel-pinion, 29, intermeshing with bevel gear-wheel 2.

I, Fig. 4, is an elevator-belt, which is driven from the main shaft d by means of the upright shaft 18, bevel gear-wheels 20 and 21, 22 and 23, shaft 24, and bevel gear-wheels 25 and 26. U is the draft-pole.

The operation of my machine is as follows: As the machine is drawn forward along a row of standing cornstalks, the guide-rod 4 passes outside the row and the stalks are directed toward the guard-fingers n by the bar N. Wheel B having been engaged by clutch e, shaft d is revolved as the machine moves forward, thereby revolving the saw D and the reel, respectively, in the direction indicated by the arrows in Fig. 1. The arms x fall in succession outside of the row of stalks to a position parallel with the arm E, and, sweeping inward, the stalks are drawn toward and between the fingers n, where they are engaged by the saw D and cut off, the arms x maintaining their extended position until the cut stalks have been swept onto the conveyer-belts S S, by which they are conveyed to the elevator-belt I, which discharges them upon the inclined table V, where they are retained by the arms 5 until the weight of the accumulated stalks compresses spring 13, and shaft O and the brackets in which it is mounted are depressed, thus forcing the clutch-collar 12 into engagement with the notched end of the revolving hollow shaft 10, thus turning shaft O a quarter-revolution and discharging the stalks, when shaft O and clutch 13 return to their normal position.

In adjusting wheel C it is thrown forward by means of the lever k to lighten the draft on the horses' necks, or backward to allow the machine to tilt forward.

I claim as my invention—

1. In a stalk-harvester, the combination, with the main frame mounted on carrying-wheels and carrying a stalk-cutter and the vertical shaft mounted on said frame and rotated by one of the carrying-wheels, of the vertically-adjustable arm, the hollow shaft having a series of arms pivoted thereto and adapted to slide longitudinally on the vertical shaft without turning thereon, and the cam arranged to control and guide the movements of said arms, the cam and hollow shaft being both supported by and secured to the arm so as to move vertically simultaneously therewith, whereby all the parts of the reel are simultaneously adjusted relatively to the cutter, substantially as and for the purpose specified.

2. In a harvester, the combination, with the main frame, of the carrying-wheel C, bracket h, arranged to slide longitudinally on ways secured to the main frame, and means, substantially as shown and described, for adjustably securing said bracket and wheel in position, as and for the purpose specified.

3. In a stalk-harvester, the main frame mounted on carrying-wheels, an elevator-belt mounted on said frame and arranged to discharge the stalks therefrom, a yielding arm arranged to receive the cut stalks from the elevator-belt, a spring or springs supporting said yielding arm, and a shaft having radial stalk-supporting arms carried in the outer end of said arm and connected with one of the carrying-wheels so as to rotate therewith when said yielding arm is depressed, all combined and arranged to co-operate substantially as and for the purpose specified.

GEO. G. F. BOSWELL.

Witnesses:
H. P. HOOD,
V. M. HOOD.